United States Patent Office 3,446,035
Patented May 27, 1969

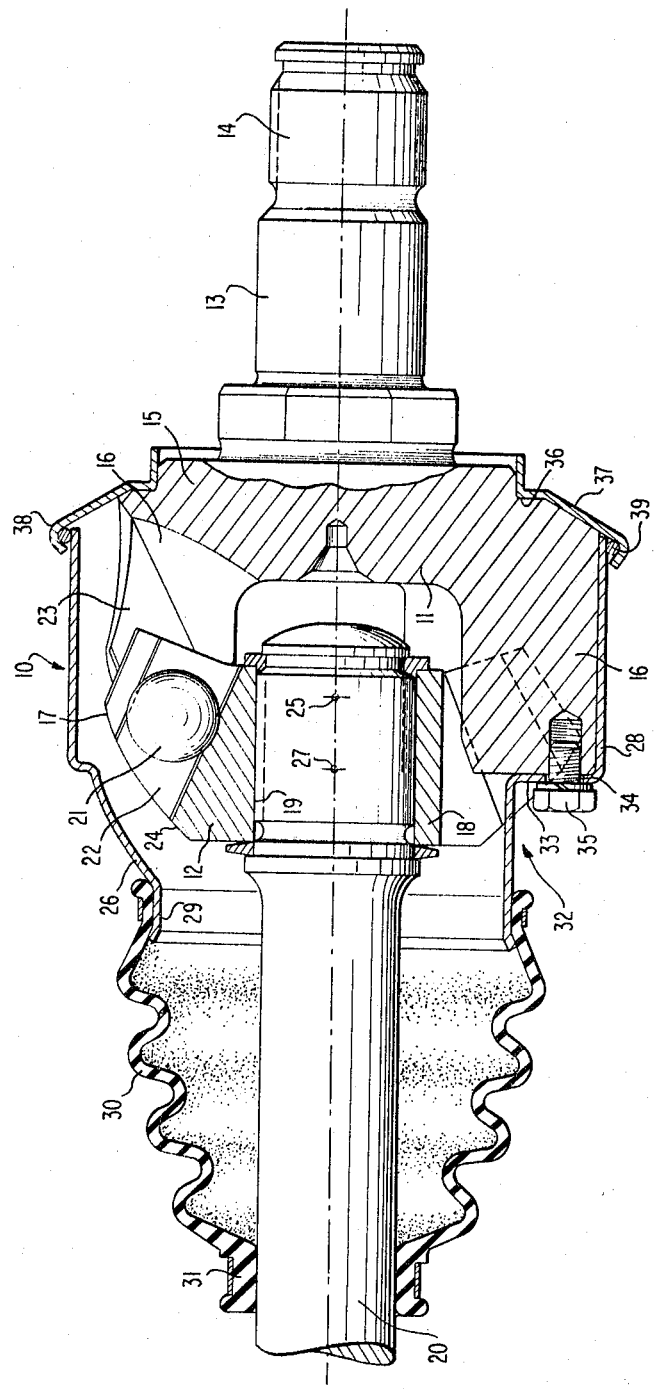

3,446,035
LIMIT ABUTMENT FOR A SYNCHRONOUS SLIDING JOINT, ESPECIALLY FOR MOTOR VEHICLES
Kurt Enke, Fellbach, Wurttemberg, Germany, assignor to Daimler-Benz Aktiengesellschaft, Stuttgart-Unterturkheim, Germany
Filed Apr. 18, 1967, Ser. No. 631,823
Claims priority, application Germany, Apr. 19, 1966, D 49,879
Int. Cl. F16d 3/02, 3/16, 3/50
U.S. Cl. 64—8     14 Claims

ABSTRACT OF THE DISCLOSURE

A synchronous sliding joint, particularly for the axle drive of motor vehicles, including a first joint part having a plurality of substantially axially-extending arms, a second joint part having a plurality of substantially radially-extending star-shaped arms, which arms are constructed spherically about the center point of the joint on the side facing the shaft, and a sleeve secured to the first joint part, surrounding the second joint part and spaced therefrom, and having a rim portion spherically constructed with a similar radius, the center point of the sphere of the rim portion being displaced relative to the center point of the joint by the predetermined sliding path.

Background of the invention

The present invention relates to a limit abutment for a synchronous sliding joint, especially for the axle drive of motor vehicles, in which a first joint part includes preferably three essentially axially extending arms between which engages the second joint part with the essentially radially extending star-shaped arms, and whereby for purposes of torque transmission balls are arranged between the arms of both joint parts, which balls are laterally engaged by mutually crossing tracks provided in the joint parts.

Joints of the aforementioned type are known per se and have also been proposed heretofore in applications assigned to the assignee of the present application. With these joints, a safety mechanism has to be provided against pulling apart the joint.

Summary of the invention

The present invention is concerned with the problem to so construct such a safety mechanism that the joint can run without noise with the safety mechanism also in a bent position. The underlying problems with the joints of the aforementioned type are solved in accordance with the present invention in that the star-shaped arms of the second joint part are constructed spherically shaped about the center point of the joint on the side thereof facing the shaft and that a sleeve is secured at the first joint part which surrounds the second joint part at a certain distance with a rim portion thereof which is spherically constructed with the same radius whereby, however, the center point of the spheres of the rim portion is displaced with respect to the joint center point by the predetermined sliding path.

The limit abutment according to the present invention offers the advantage that the joint can no longer be pulled apart. The joint, however, now can operate at the spherical surfaces of the abutment also in the bent position and more particularly without producing thereby any noise. Simultaneously therewith, the joint is protected by the surrounding sleeve and the oil filling can additionally be retained by the same.

With a preferred embodiment according to the present invention, the sleeve surrounds the first joint part completely in a pot-shaped manner, and is secured at the end faces of the arms of the first joint part, whereby for this securing the spherically shaped rim portion is provided with as many indentations as the first joint part possesses arms. It is thereby appropriate in that case if an essentially cylindrical collar internally adjoins the spherically shaped rim portion whereby the indentations extend from this collar approximately parallel to the axis up to the first joint part where they pass over into abutment surfaces perpendicularly to the axis in which are arranged bores for the threaded connection at the end faces of the arms of the first joint part.

The sleeve is advantageously made of sheet metal. As a result of the indentations provided according to the present invention, the sleeve is extraordinarily rigid. A folding bellows of smallest possible diameter and therewith of highest rotational-speed rigidity or strength can be slipped over and mounted on the inner collar thereof.

Appropriately, a sheet metal cover is mounted on the first joint part from its shaft side, which externally surrounds the sleeve at its end with a fold by the interposition of a sealing ring. For purposes of assembly of this sheet metal cover, the first joint part is appropriately offset laterally in a step-shaped manner on its shaft. A fully enclosed pot results from the sleeve and sheet metal cover in this manner which retains the oil filling of the joint.

Accordingly, it is an object of the present invention to provide a synchronous sliding joint of the type described above which avoids, by simple and inexpensive means, the aforementioned shortcomings encountered with the prior art constructions.

It is another object of the present invention to provide a synchronous sliding joint, especially for the axle drive of motor vehicles, which includes safety means preventing the undesired pulling apart of the joint parts.

Another object of the present invention resides in a limit abutment for a synchronous sliding joint of the type described above which is simple in construction, inexpensive to manufacture and assemble, and extraordinarily reliable in operation for its intended purposes.

Still a further object of the present invention resides in a synchronously sliding joint of the type described above which not only cannot be pulled apart but which can rotate in a bent position without producing any noises.

A still further object of the present invention resides in a limit abutment constituting a safety means for a synchronous sliding joint of the type described above which at the same time forms a housing to retain the oil filling for the joint.

These and further objects, features and advantages of the present invention will become more obvious from the following description when taken in connection with the accompanying drawing which shows, for purposes of illustration only, one embodiment in accordance with the present invention and wherein:

The single figure is a cross-sectional view through one embodiment of the joint in accordance with the present invention for the axle drive of a motor vehicle.

Referring now to the single figure of the drawing, the joint generally designated by reference numeral 10 consists of a first joint part 11 and of a second joint part 12. At the first joint part 11, the stub shaft 13—on the spline teeth of which may be arranged, for example, the bevel gear of a differential gear—passes over into a flange part 15 from which extend three arms 16 essentially in axial direction opposite the stub shaft 13.

The arms 17 of the second joint part 12 engage between the arms 16 of the first joint part 11. These arms 17 extend in a star-shaped manner, i.e., essentially radially from a hub portion 18. The second joint part 12 is secured by means of this hub portion 18 and spline teeth 19 on a shaft 20 which may be the half-axle of a rear axle drive in a motor vehicle and which may accommodate at its other end again a similar joint 10.

Balls 21 for the transmission of torque are arranged between the arms 16 and 17 of the two joint parts 11 and 12. These balls 21 are supported in mutually crossing tracks 22 and 23 which are machined or cut in a conventional manner into the mutually facing lateral surfaces of the arms 16 and 17. It is appropriate if the radius of these tracks 22 and 23 is slightly larger than the radius of the balls 21.

The arms 17 of the second joint part 12 are machined on their side facing the shaft 20 in a spherically shaped manner so that a spherical surface 24 results thereat whose center point is the center point 25 of the joint. Further spherical surfaces 26 serve as abutment for these spherical surfaces 24 which surfaces 26 have the same spherical radius but whose center point 27 is displaced by the predetermined sliding path of the joint with respect to the center point 25 of the joint. The spherical surfaces 26 are constituted by a sleeve 28 which is emplaced or mounted externally on the first joint part 11. This sleeve 28 surrounds the arms 16 of this joint part 11 in a pot-shaped manner over the entire length thereof. The spherical surfaces 26 are arranged in the rim portion thereof and pass over inwardly into an approximately cylindrical collar 29 on which is arranged a folding bellows 30, which, with its inner end 31, abuts sealingly against the shaft 20. For purposes of its securing the sleeve 28, corresponding to the number of arms 16, is provided with three indentations generally designated by reference numeral 32. These indentations extend, starting from the collar 29, initially approximately parallel to the axis and then pass over into surface 33 perpendicular to the axis in which are arranged bores 34. The sleeve 28 is then secured at the end faces of the arms 16 with the aid of bolts or screws 35.

A step-shaped offset 36 is arranged in the flange-like part 15 of the first joint part 11 on its shaft side. A sheet-metal cover 37 is placed over this offset 36. Corresponding to the flange 15, the cover 37 is constructed conically on its rear side and surrounds externally by means of a fold 38 the sleeve 28 at its end. A sealing ring 39 is disposed between the sleeve 28 and the fold 38. In this manner, a fully closed pot-shaped body results from the sleeve 28 and the cover 37 which retains the oil filling of the joint.

The operation of the limit abutment according to the present invention is believed obvious from the drawing. If one pulls apart the joint 10 with its two shafts 20 and 13, then the spherical surfaces 24 abut against the spherical surfaces 26 of the sleeve 28. Since the abutment surfaces 26 are constructed spherically, the joint can operate also bent in this pulled apart position. A noise development is thereby precluded.

While I have shown and described one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A limit abutment for a synchronous sliding joint, especially for the axle drive of motor vehicles, in which a first joint part includes essentially axially extending arms, essentially radially extending star-like arms of a second joint part extending between the arms of the first joint part, and balls arranged between the arms of the joint parts for the transmission of torque which are laterally supported in mutually crossing tracks provided in the joint parts, wherein the improvement comprises approximately star-like arms provided on the side of the second joint part facing radially-inward with spherical surfaces and sleeve means secured at the first joint part having a rim portion normally surrounding the second joint part with a spacing, the rim portion being constructed spherically with the same radius as the spherical surfaces of the arms of the second joint part, but the center point of the spherical surfaces of the rim portion being displaced by a predetermined sliding path with respect to the center point of the spherical surfaces of the arms of the second joint part.

2. A limit abutment according to claim 1, wherein the center point of the spherical surfaces of the arms of the second joint part coincides with the center point of the joint.

3. A limit abutment according to claim 1, wherein said first and second joint parts each have three arms.

4. A limit abutment according to claim 2, wherein said sleeve means substantially completely surrounds said first joint part in a pot-shaped manner and is secured at the end faces of the arms of the first joint part, and wherein the spherically shaped rim portion of said sleeve means is provided with as many indentations for the securing thereof at the first joint part as there are arms in the first joint part.

5. A limit abutment according to claim 4, wherein said sleeve means includes an essentially cylindrical collar portion adjoining the spherically shaped rim portion, the indentations extending approximately parallel to the axis from this collar portion up to the first joint part where they pass over into abutment surfaces extending approximately normally to the axis, and bores being provided in said abutment surfaces for the threaded connection with the first joint part.

6. A limit abutment according to claim 5, further comprising cover means placed over the first joint part from its shaft side, said cover means externallly surrounding the sleeve means at its end with a fold by the interposition of a sealing ring.

7. A limit abutment according to claim 6, wherein the first joint part is offset in a step-shaped manner on its shaft side for the emplacement of the cover means.

8. A limit abutment according to claim 6, wherein said cover means is made from sheet metal.

9. A limit abutment according to claim 1, wherein said sleeve means substantially completely surrounds said first joint part in a pot-shaped manner and is secured at the end faces of the arms of the first joint part, and wherein the spherically shaped rim portion of said sleeve means is provided with as many indentations for the securing thereof at the first joint part as there are arms in the first joint part.

10. A limit abutment according to claim 1, wherein said sleeve means includes an essentially cylindrical collar portion adjoining the spherically shaped rim portion, the indentations extending approximately parallel to the axis from this collar portion up to the first joint part where they pass over into abutment surfaces extending approximately normally to the axis, and bores being provided in said abutment surfaces for the threaded connection with the first joint part.

11. A limit abutment according to claim 10, further comprising cover means placed over the first joint part from its shaft side, said cover means externally surrounding the sleeve means at its end with a fold by the interposition of a sealing ring.

12. A limit abutment according to claim 11, wherein the first joint part is offset in a step-shaped manner on its shaft side for the emplacement of the cover means.

13. A limit abutment according to claim 1, further comprising cover means placed over the first joint part from its shaft side, said cover means externally surrounding the sleeve means at its end with a fold by the interposition of a sealing ring.

14. A limit abutment according to claim 13, wherein the first joint part is offset in a step-shaped manner on its shaft side for the emplacement of the cover means.

References Cited
UNITED STATES PATENTS

| | | | |
|---|---|---|---|
| 1,799,661 | 4/1931 | Weiss | 64—32 |
| 2,432,803 | 12/1947 | Rice | 64—32 |
| 3,298,200 | 1/1967 | Altmann et al. | 64—21 |
| 3,338,070 | 8/1967 | Scott | 64—21 |

HALL C. COE, *Primary Examiner.*

U.S. Cl. X.R.

64—32